United States Patent Office 3,121,080
Patented Feb. 11, 1964

3,121,080
PROCESS FOR THE MANUFACTURE OF 18:20-
LACTONES OF THE PREGNANE SERIES
Charles Meystre, Basel, Albert Wettstein, Riehen, Oskar
Jeger, Zurich, and Georg Anner, Karl Heusler, and
Peter Wieland, Basel, Switzerland, assignors to Ciba
Corporation, a corporation of New Jersey
No Drawing. Filed Dec. 8, 1960, Ser. No. 74,487
Claims priority, application Switzerland Dec. 11, 1959
4 Claims. (Cl. 260—239.57)

The present invention relates to a process for the manufacture of saturated or unsaturated 18:20-lactones of 20-hydroxy-pregnane-18-acids by oxidizing 18-substituted 18:20-oxido pregnane-compounds.

It has been found that saturated or unsaturated 18:20-lactones of 20-hydroxy-pregnane-18-acids can be obtained in excellent yield by oxidizing cyclic 18:20-hemiacetals of saturated or unsaturated 18-oxo-20-hydroxy-pregnanes or their hydriodic acid esters.

The cyclic hemiacetals of 18-oxo-20-hydroxy-pregnanes, that is to say 18-hydroxy-18:20-oxido-pregnanes and their hydriodic acid esters, viz, the 18-iodo-8:20-oxido-pregnanes, used as starting materials may be easily obtained by the process described in patent application No. 74,486, filed December 8, 1960, from 18-unsubstituted 20-hydroxy-pregnanes. The process of the aforementioned patent application consists in treating a 20-hydroxy-pregnane with a lead acylate having an oxidizing action, especially with a lead tetraacylate, such as lead tetraacetate in the presence of iodine, and if desired, hydrolysing the rather instable 18-iodo-18:20-oxido-pregnanes formed to 18-hydroxy-18:20-oxido-pregnanes. Hydrolysis may be either performed directly or by exchanging the iodine atom for an acyloxy group followed by saponification.

The present invention provides a process for oxidizing the so-obtained products to form 18:20-lactones of 20-hydroxy-pregnane-18-acids.

For the oxidation of the 18-hydroxy-18:20-oxido-pregnanes according to the present invention various oxidizing agents are suitable, primarily compounds of hexavalent chromium, such as chromium trioxide, for example in the form of a pyridine complex, in acetic acid solution, or in acetone solution in the presence of sulphuric acid, or manganese dioxide or N-halogen carboxylic acid amides or imides, for example bromacetamide or bromosuccinimide. The 20:18-lactones of 20-hydroxy-pregnane-18-acids may also be obtained directly from the 18-iodo-18:20-oxido-compounds by performing oxidation in the presence of a heavy metal chromate, for example lead chromate or especially silver chromate.

When the starting materials contain in other positions than in the 18-position free, secondary hydroxyl groups, for example in the 3- and/or 11-position, the latter are dehydrogenated to form ketones simultaneously with the oxidation.

As starting materials for the present process there are suitable 18-hydroxy-18:20α-oxido-compounds and 18-hydroxy-18:20β-oxido-compounds of the 5α- and 5β-pregnane series and of the 19-nor-pregnane series and their hydriodic acid esters which may contain further substituents in the ring system, particularly in one or more of the positions 1, 2, 3, 4, 5, 6, 7, 8, 9, 10, 11 12, 14 15, 16, 17 or 21, such as free or functionally converted hydroxyl or oxo groups, alkyl groups, such as methyl, or halogen atoms. Functionally converted hydroxyl or oxo groups are esterified or etherified hydroxyl groups or ketalised oxo groups. In addition, the starting materials may contain double bonds or oxido groups, for example starting from carbon atom 5 and/or in 9:11-position.

The 20-hydroxy-18-aldehydes of the pregnane series, which are almost entirely present in the cyclo-hemiacetal form as 18-hydroxy-18:20-oxido-compounds, and which are used as starting materials may be unsubstituted in the 17- and/or 21-position or substituted by an esterified or etherified hydroxyl group.

The following compounds are, for example, specific starting materials:

3β-acyloxy-18-iodo-18:20-oxido-5α-pregnanes,
3β-acyloxy-11-oxo-18-iodo-18:20-oxido-5α-pregnanes,
3β:11β-diacyloxy-18-iodo-18:20-oxido-5α-pregnanes,
3β:11α-diacyloxy-18-iodo-18:20-oxido-5α-pregnanes,
3α-acyloxy-18-iodo-18:20-oxido-5β-pregnanes,
3α-acyloxy-11-oxo-18-iodo-18:20-oxido-5β-pregnanes,
3α,11β-diacyloxy-18-iodo-18:20-oxido-5β-pregnanes,
3α,11α-diacyloxy-18-iodo-18:20-oxido-5β-pregnanes,
$\Delta^4$-3-oxo-11α-acetoxy-18-iodo-18:20-oxido-pregnene,
$\Delta^5$-3-ethylenedioxy-11α-acetoxy-18-iodo-18:20-oxido-pregnene,
$\Delta^4$-3-oxo-11β-acetoxy-18-iodo-18:20-oxido-pregnene,
$\Delta^5$-3-ethylenedioxy-11-oxo-18-iodo-18:20-oxido-pregnene,
$\Delta^4$-3:11-dioxo-18-iodo-18:20-oxido-pregnene,
$\Delta^5$-3-ethylenedioxy-11-oxo-18-iodo-18:20-oxido-pregnene,
$\Delta^{4:9:11}$-3-oxo-18-iodo-18:20-oxido-pregnadiene,
$\Delta^{5:9:11}$-3-ethylenedioxy-18-iodo-18:20-oxido-pregnadiene,
$\Delta^4$-3-oxo-9:11β-oxido-18-iodo-18:20-oxido-pregnene,
$\Delta^5$-3-ethylenedioxy-9:11β-oxido-18-iodo-18:20-oxido-pregnene,
$\Delta^4$-3-oxo-11α-hydroxy-18-iodo-18:20-oxido-19-nor-pregnene,
$\Delta^5$-3-ethylenedioxy-11α-hydroxy-18-iodo-18:20-oxido-19-nor-pregnene.

In addition, the following 18-hydroxy-18:20-oxido-compounds may be used as starting materials, especially in the form of their 3-mono- or 3:11-di-esters:

3β:18-dihydroxy-18:20-oxido-5α-pregnane,
3β:18-dihydroxy-11-oxo-18:20-oxido-5α-pregnene,
3β:18-dihydroxy-11β-acyloxy-18:20-oxido-5α-pregnane,
3β;11α:18-trihydroxy-18:20-oxido-5α-pregnane,
3α:18-dihydroxy-18:20-oxido-5β-pregnane,
3α:18-dihydroxy-11-oxo-18:20-oxido-5β-pregnane,
3α:18-dihydroxy-11β-acyloxy-18:20-oxido-5β-pregnane,
3α;11α:18-trihydroxy-18:20-oxido-5β-pregnane,
$\Delta^4$-3-oxo-11α:18-dihydroxy-18:20-oxido-pregnene,
$\Delta^4$-3-oxo-11α-acetoxy-18-hydroxy-18:20-oxido-pregnene,
$\Delta^5$3-ethylenedioxy-11α:18-dihydroxy-18:20-oxido-pregnene,
$\Delta^5$-3-ethylenedioxy-11α-acetoxy-18-hydroxy-18:20-oxido-pregnene,
$\Delta^4$-3-oxo-11β-acetoxy-18-hydroxy-18:20-oxido-pregnene,
$\Delta^5$-3-ethylenedioxy-11β-acetoxy-18-hydroxy-18:20-oxido pregnene,
$\Delta^4$-3:11-dioxo-18-hydroxy-18:20-oxido-pregnene,
$\Delta^5$-3-ethylenedioxy-11-oxo-18-hydroxy-18:20-oxido-pregnene,
$\Delta^{4:9:11}$-3-oxo-18-hydroxy-18:20-oxido-pregnene,
$\Delta^{5:9:11}$-3-ethylenedioxy-18-hydroxy-18:20-oxido-pregnadiene,
$\Delta^4$-3-oxo-9:11β-oxido-18-hydroxy-18:20-oxido-pregnene,
$\Delta^5$-3-ethylenedioxy-9:11β-oxido-18-hydroxy-18:20-oxido-pregnene,
$\Delta^5$-3β;18:21-trihydroxy-18:20-oxido-pregnene,
$\Delta^{1,4}$-3-oxo-18-hydroxy-18:20-oxido-pregnadiene,
$\Delta^4$-3-oxo-11α:18-dihydroxy-18:20-oxido-19-nor-pregnene,
$\Delta^5$-3-ethylenedioxy-11α:18-dihydroxy-18:20-oxido-19-nor-pregnene.

From all of these compounds there are obtained by oxidation the corresponding 18:20-lactones of 20-hydroxy-pregnane-18-acids. The latter are valuable intermediate products for the production of aldosterone and related compounds. The 18:20-lactones may be converted into the 18:11-lactones of 11β-hydroxy-pregnane-18-acids, if desired, after suitably converting the substituents in the 3-position and, if desired, after introducing a double bond in ring A and/or an oxygen function in the 11-position. These reactions are described in patent application No. 74,470, filed December 8, 1960. A substantial part of the reactions described therein is illustrated, for example, by the following diagram:

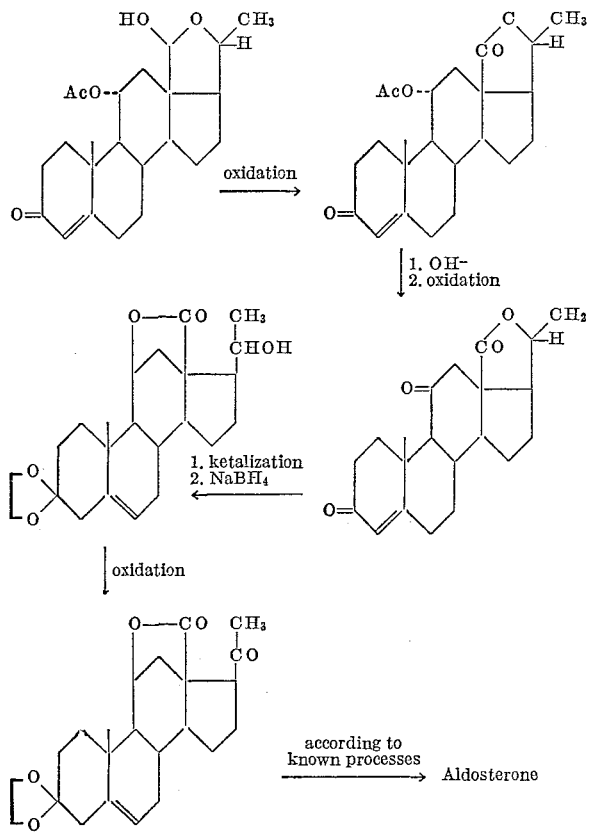

The following examples illustrate the invention.

*Example 1*

1.30 grams of crude crystalline 3β-acetoxy-18-hydroxy-18:20β-oxido-5α-pregnane are dissolved in 10 ml. of pyridine and treated with a solution of 2.0 grams of chromium trioxide in 4 ml. of water. The solution is allowed to stand for 15 hours at 20° C., ice is then added and a little sodium bisulphite solution, and the reaction mixture is extracted with ether. The ethereal solution is washed with dilute sodium carbonate solution and water, dried and evaporated under reduced pressure. The residue (1.2 grams) is chromatographed on 30 grams of aluminium oxide (activity II), elution being performed first with hexane and them with a mixture of pentane and benzene (1:1). The first hexane fractions yield on evaporation 200 mg. of oily product. The further hexane and pentane-benzene fractions are combined and recrystallized from hexane to yield 400 mg. of the 18:20β-lactone of 3β-actoxy-20β-hydroxy-5α-pregnane-18-acid melting at 197–207° C. Infrared spectrum in methylene chloride; bands interalia at 5.73μ (5-ring lactone) and at 5.81μ, 8.08μ and 9.74μ (acetate). A further quantity of the lactone is obtained by subjecting the mother liquors to chromatography. The evaporated ether eluates of the chromatography yield on recrystallization from a mixture of hexane and pentane 90 mg. of 3β-acetoxy-20-hydroxy-18:20-oxido-5α-pregnane melting at 184–194° C. Infrared spectrum in methylene chloride; bands inter alia at 2.70μ (hydroxyl) and at 5.81μ, 8.08μ and 9.71μ (acetate). By oxidizing Δ5-3β-acetoxy-18-hydroxy-18:20β-oxido-pregnene of M.P. 203–206° C. (which is obtained by analogous oxidation of Δ5-3β-acetoxy-20β-hydroxy-pregnene with lead tetraacetate and iodine, treatment with sodium acetate in dimethylformamide and hydrolysis with acetic acid of 60% strength) there is obtained in an analogous manner the 18:20-lactone of Δ5-3β-acetoxy-20β-hydroxy-pregnene-18-acid melting at 204–206° C. described in Example 15.

The 18-hydroxy-18:20β-oxido-compound used as starting material is prepared as follows:

1 gram of 3β-acetoxy-20β-hydroxy-5α-pregnane, 6 grams of lead tetraacetate dried in a high vacuum, 2 grams of calcium carbonate and 2 grams of iodine are covered with 200 ml. of cyclohexane. The suspension is boiled under reflux with calcium chloride seal for 1½ hours with stirring, cooled and suction-filtered. The residue is washed with ether, the solution diluted with ether is then washed with an aqueous sodium thiosulphate solution and water, dried and evaporated in vacuo first at 40–50° C. and then at 20° C. The residue is treated with 2 grams of sodium acetate and 50 cc. of acetic acid of 80% strength. The solution is heated for 1 hour on a water bath, evaporated in vacuo, the residue is taken up in ether, the ethereal solution washed with dilute sodium carbonate solution and water, dried and evaporated in vacuo. There are obtained 1.30 grams of crude crystalline 3β-acetoxy-18-hydroxy-18:20β-oxido-5α-pregnane.

*Example 2*

710 mg. of crude Δ4-3-oxo-11α:18-dihydroxy-18:20β-oxido-pregnene are dissolved in 5 ml. of pyridine and treated with a cooled mixture of 1 gram of chromium trioxide in 2 ml. of water and 5 ml. of pyridine. After standing for 15 hours at 20° C. the oxidation mixture is treated with ice and an aqueous solution of 2 grams of sodium sulphite, evaporated in vacuo and the residue extracted with ethyl acetate. The ethyl acetate solution is washed with dilute hydrochloric acid, water, dilute sodium carbonate solution and water, dried and evaporated in vacuo. The residue is recrystallized from acetone or a mixture of acetone and pentane, the 18:20β-lactone of Δ4-3:11-dioxo-20β-hydroxy-pregnene - 18 - acid being obtained in the form of prisms melting at 252–260° C. Infrared spectrum in methylene chloride: bands inter alia at 5.71μ (5 ring lactone), 5.86μ (11-ketone), 6.00μ and 6.22μ (Δ4-3-ketone).

The crude product used as starting material is prepared as follows:

6 grams of lead tetraacetate dried in a high vacuum at 20° C., 2 grams of iodine and 2 grams of dry calcium carbonate are covered with 200 ml. of cyclohexane. The suspension is boiled under reflux with calcium chloride seal for 1 hour with stirring. 1 gram of Δ5-3-ethylenedioxy-11α-acetoxy-20β-hydroxy-pregnene is then added and the whole is boiled under reflux for 6 hours. The reaction mixture is cooled, the inorganic salts are suctioned off and washed with ether. The solution is then diluted with ether and extracted with a sodium thiosulphate solution and water. The ethereal solutions are treated with 2 grams of sodium acetate and 50 ml. of acetic acid of 80% strength and the ether is distilled off on a water bath. The remaining acetic acid solution is heated for another 2 hours on a boiling water bath, concentrated extensively in vacuo and the residue taken up in ether and water. The ethereal solution is washed with dilute sodium carbonate solution and water, dried and evaporated. The residue (1.05 grams) contains Δ4-3-oxo-11α-acetoxy-18-hydroxy-18:20β-oxido-pregnene. The reaction product is covered with a solution of 1 gram of potassium carbonate in 10 ml. of water and 50 ml. of methanol. The resulting solution is boiled under reflux for 5 hours, evaporated extensively in vacuo, the residue taken up in ethyl acetate and water, the ethyl acetate solution washed with dilute sodium carbonate solution and water, dried and evaporated in vacuo. There are obtained 710 mg. of crude $\Delta^4$-3-oxo-11$\alpha$:18-dihydroxy-18:20$\beta$-oxido-pregnene.

Example 3

1.05 grams of crude $\Delta^4$-3-oxo-11$\alpha$-acetoxy-18-hydroxy-18:20$\beta$-oxido-pregnene are dissolved in 5 ml. of pyridine and treated with a cooled solution of 1.5 grams of chromium trioxide in 3 ml. of water and 5 ml. of pyridine. The solution is allowed to stand for 15 hours at 20° C., is then treated with ice and a sodium sulphite solution and evaporated in vacuo. The residue is extracted with ethyl acetate. The ethyl acetate solutions are washed with dilute hydrochloric acid, water, dilute sodium carbonate solution and water, dried and evaporated in vacuo. The residue (810 mg.) is chromatographed on 25 grams of aluminium oxide (activity II). From the first benzene-pentane (1:1) fractions there are obtained from a mixture of ether and pentane about 20 mg. of crystals melting at 186–195° C. From the benzene-pentane (1:1), benzene and ether eluates (total 500 mg.) a product is obtained which on being recrystallized from a mixture of ether and pentane melts at 188–194° C. (it is not identical with the crystals from the first fractions) and is the 18:20-lactone of $\Delta^4$-3-oxo-11$\alpha$-acetoxy-20$\beta$-hydroxy-pregnene-18-acid. Infrared spectrum in methylene chloride: bands inter alia at 5.74$\mu$ (5-ring lactone) 5.81$\mu$, 8.09$\mu$ and 9.72$\mu$ (acetate) and 6.01$\mu$ and 6.21$\mu$ ($\Delta^4$-3-ketone).

The crude product used as starting material is prepared by converting 1 gram of $\Delta^5$-3-ethylenedioxy-11$\alpha$-acetoxy-20$\beta$-hydroxy-pregnene into $\Delta^4$-3-oxo-11$\alpha$-acetoxy-18-hydroxy-18:20$\beta$-oxido-pregnene as described in Example 2. Infrared spectrum in methylene chloride; bands inter alia at 2.70$\mu$ (hydroxyl), 5.82$\mu$, 8.09$\mu$ and 9.75$\mu$ (acetate) and at 6.02$\mu$ and 6.22$\mu$ ($\Delta^4$-3-ketone).

In an analogous manner there is obtained from $\Delta^5$-3-ethylenedioxy-11$\alpha$-acetoxy - 20$\alpha$ - hydroxy - pregnene in 52% yield $\Delta^4$-3-oxo-11$\alpha$-acetoxy - 18 - hydroxy - 18:20$\alpha$-oxido-pregnene which is oxidized to the 18:20-lactone of $\Delta^4$-3-oxo-11$\alpha$-acetoxy-20$\alpha$-hydroxy - pregnene - 18 - acid as described above.

Example 4

835 mg. of crude $\Delta^{4:9(11)}$-3-oxo-18-hydroxy-18:20-oxido-pregnadiene are dissolved in 5 ml. of pyridine and treated with a solution of 1 gram of chromium trioxide in 2 ml. of water and 5 ml. of pyridine. The solution is allowed to stand for 12 hours at 20° C., is then treated with an aqueous sodium sulphite solution and ice, extracted with ethyl acetate, the ethyl acetate solution washed with dilute hydrochloric acid, water, sodium carbonate, and water, dried and evaporated in vacuo. The resulting 18:20-lactone of $\Delta^{4:9(11)}$-3-oxo-20$\beta$-hydroxy-pregnadiene-18-acid exhibits in the infrared spectrum in methylene chloride bands inter alia at 5.73$\mu$ (5-ring lactone), 6.00$\mu$ and 6.22$\mu$ ($\Delta^4$-3-ketone).

The starting material used in this example is prepared as follows:

1 gram of $\Delta^{5:9(11)}$-3-ethylenedioxy-20$\beta$-hydroxy-pregnadiene, 6 grams of lead tetraacetate dried in a high vacuum, 2 grams of dry calcium carbonate and 2 grams of iodine are covered with 200 ml. of cyclohexane. The suspension is boiled for 6 hours under reflux with calcium chloride seal, cooled, the insoluble portion is suctioned off and washed with ether. The filtrate is washed with a solution of sodium thiosulphate and water, dried, treated with 2 grams of dry sodium acetate and evaporated in vacuo. The residue is treated with 50 ml. of acetic acid of 80% strength, heated on a boiling water bath, evaporated in vacuo, the residue taken up in ether, the ethereal solution washed with dilute sodium carbonate solution and water, dried and evaporated in vacuo. The resulting crude $\Delta^{4:9(11)}$-3-oxo-18-hydroxy-18:20$\beta$-oxido-pregnadiene (835 mg.) exhibits in the infrared spectrum in methylene chloride bands inter alia at 2.70$\mu$ (hydroxyl), 6.00$\mu$ and 6.22$\mu$ ($\Delta^4$-3-ketone).

Example 5

When 1.0 gram of $\Delta^{1:4}$-3-oxo-18-hydroxy-18:20-oxido-pregnadiene is oxidized as described in Example 4 with chromium trioxide there is obtained the 18:20-lactone of $\Delta^{1:4}$-3-oxo-20$\beta$-hydroxy-pregnadiene-18-acid melting at 240–243° C. In the infrared spectrum in methylene chloride the product exhibits bands inter alia at 5.72$\mu$ (5-ring lactone) and at 6.01$\mu$, 6.16$\mu$ and 6.24$\mu$ ($\Delta^{1:4}$-3-ketone).

The above starting material is prepared as described in Example 4 from $\Delta^{1:4}$-20$\beta$-hydroxy-pregnadiene-3-one. $\Delta^{1:4}$-18-hydroxy-18:20-oxido-pregnadiene-3-one exhibits in the infrared spectrum bands inter alia at 2.73$\mu$ (hydroxyl) and at 6.02$\mu$, 6.16$\mu$ and 6.23$\mu$ ($\Delta^{1:4}$-3-ketone).

Example 6

920 mg. of crude 3$\beta$-acetoxy-16$\alpha$-methyl-18-hydroxy-18:20$\beta$-oxido-5$\alpha$-pregnane are dissolved in 10 ml. of pyridine, the solution is treated at 0° C. with a solution of 5 grams of chromium trioxide in 10 ml. of water and 10 ml. of pyridine and the whole is allowed to stand for 15 hours at 20° C. The solution is then treated with ice and a sodium bisulphite solution, extracted with ethyl acetate, the ethyl acetate solutions washed with dilute hydrochloric acid, water, dilute sodium carbonate solution and water, dried and evaporated in vacuo. The residue contains the 18:20-lactone of 3$\beta$-acetoxy-20$\beta$-hydroxy-16$\alpha$-methyl-5$\alpha$-pregnane-18-acid and in the infrared spectrum in methylene chloride exhibits bands inter alia at 5.71$\mu$ (5-ring lactone) and at 5.82$\mu$, 8.10$\mu$ and 9.75$\mu$ (acetate).

The 18-hydroxy-compounds used as starting material may be prepared as follows:

6 grams of lead tetraacetate dried in a high vacuum, 2.2 grams of diodine and 2 grams of calcium carbonate are covered with 200 ml. of cyclohexane. The suspension is boiled under reflux for 30 minutes with stirring and exclusion of moisture. 1 gram of 3$\beta$-acetoxy-16$\alpha$-methyl-20$\beta$-hydroxy-5$\alpha$-pregnane, which is prepared by catalytic reduction (platinum and glacial acetic acid) of 3$\beta$-acetoxy-16$\alpha$-methyl-20-oxo-5$\alpha$-pregnane, is then added. The reaction mixture is boiled for 6 hours, then cooled, the insoluble salts are suctioned off and washed with ether. The filtrate is washed with a solution of sodium thiosulphate and water, dried and treated with 2 grams of dry sodium acetate. After evaporating the solvent-mixture in vacuo, the residue is dissolved in 50 ml. of acetic acid of 80% strength, heated for 2 hours on a boiling water bath and evaporated. The residue is extracted with ether, the ether solution washed with water, dilute sodium carbonate solution and water, dried and evaporated in vacuo. There are obtained 920 mg. of crude 3$\beta$-acetoxy-18-hydroxy-18:20$\beta$ - oxido - 16$\alpha$ - methyl - 5$\alpha$ - pregnane. In the infrared spectrum in methylene chloride the product exhibits bands inter alia at 2.73$\mu$ (hydroxyl) and at 5.81$\mu$, 8.09$\mu$ and 9.74$\mu$ (acetate).

Example 7

6.0 grams of $\Delta^5$-3-ethylenedioxy-11$\alpha$-acetoxy-18-hydroxy-18:20-oxido-pregnene are dissolved in 48 ml. of pyridine and treated at 0° C. with a chromic acid solution prepared at 0° C. consisting of 12 grams of chromium trioxide, 24 ml. of water and 24 ml. of pyridine. The solution is stirred for 20 hours at 30° C. and is then treated with ice, 100 ml. of ethyl acetate and a solution of 40 grams of sodium thiosulphate in 80 ml. of water. The brown suspension is extracted with ethyl acetate. The ethyl acetate solutions are washed several times with approximately 0.5 N-sodium carbonate solution and water, dried and evaporated in vacuo. The crystalline residue can be easily recrystallized from a mixture of methylene chloride and ether which contains traces of pyridine. There are obtained 5 grams of the 18:20-lactone of $\Delta^5$-3-ethylenedioxy - 11$\alpha$-acetoxy-20$\beta$-hydroxy-pregnene - 18-acid melting at 235–247° C. On subjecting the mother liquors to chromatography on 60 grams of aluminum oxide there is obtained a further quantity of this lactone from the benzene fractions.

The 18-hydroxy-compound used as starting material may be prepared as follows:

60 grams of lead tetraacetate are freed from acetic acid in a desiccator at room temperature for about 30 minutes at a water jet vacuum, then for another 30 minutes in a high vacuum, then heated at the boil with 20 grams of dried calcium carbonate and 1.8 liters of cyclohexane with stirring. 16 grams of iodine are then added and the whole is boiled under reflux for 1 hour. 10 grams of $\Delta^5$-3-ethylenedioxy-11$\alpha$-acetoxy-20$\beta$-hydroxy-pregnene are then added, the suspension is boiled under reflux for 4 hours, cooled to room temperature and suction-filtered. The residue is washed thoroughly with ether. The filtrate is washed at 0° C. with sodium thiosulphate solution and water, dried and then poured on to 30 grams of anhydrous sodium acetate and 100 ml. of dimethylformamide, and the solution evaporated in vacuo. The remaining dimethylformamide solution is diluted with 100 ml. of dimethylformamide, and the whole is heated for 2 hours on a boiling water bath. The dimethylformamide solution is then extensively evaporated in vacuo at about 90–95° C., cooled and diluted with water. The residue is taken up in ether, the ethereal solution washed with water, dried, filtered through a column of 100 grams of aluminum oxide and the column rinsed with ether. From the evaporated ether solution there are obtained 11.3 grams of crude $\Delta^5$-3-ethylenedioxy-11$\alpha$:18-diacetoxy-18:20-oxido-pregnene.

To the resulting crude diacetate there are added 10 grams of potassium carbonate, 100 ml. of water and 400 ml. of methanol, and the solution is boiled under reflux for 1 hour. After the addition of water, the methanol is removed by distillation in a vacuum and the residue is extracted with ether. The ethereal solution is washed with water, dried and evaporated. The residue is crystallized from about 50 ml. of freshly distilled isopropyl ether. The crystals are suction-filtered, washed thoroughly with isopropyl ether and dried. From the concentrated mother liquor a further quantity of crystals may be obtained. A total of 6.2 grams of $\Delta^5$-3-ethylenedioxy-11$\alpha$-acetoxy-18-hydroxy-18:20-oxido - pregnene melting at 202–208° C. is obtained. On subjecting the mother liquors (4–5 grams) to chromatography on 120 grams of aluminum (4–5 grams) to chromatography on 120 grams of aluminum oxide a further quantity of this compound can be obtained from the ether eluates.

*Example 8*

970 mg. of crude $\Delta^{4:9:11}$-3-oxo-18-hydroxy-18:20-oxido-pregnadiene dissolved in 6 ml. of pyridine are added to a solution of 1.5 grams of chromium trioxide in 3 ml. of water and 3 ml. of pyridine. After being allowed to stand for 20 hours at room temperature and adding 20 grams of ice, there are added slowly 10 ml. of a sodium bisulphite solution of 40% strength and, 10 minutes later, 2 N-hydrochloric acid until the mixture reacts acid to Congo. The reaction mixture is extracted with ethyl acetate and the ethyl acetate solution washed with 2 N-sodium carbonate solution and water. The residue of the dried and evaporated organic solution is chromatographed on 40 grams of silica gel containing 15% of water. From the fractions eluted with a mixture of benzene and ethyl acetate (19:1) there is obtained the 18:20-lactone of $\Delta^{4:9:11}$-3-oxo-20$\beta$-hydroxy-pregnadiene-18-acid described in Example 4 which melts at 205–210° C. when crystallized from a mixture of methylene chloride and ether.

The fractions eluted with a mixture of benzene and ethyl acetate (9:1) yield a substance which contains in addition an acetoxy group. This substance has probably the structure of the 18:20-lactone of $\Delta^{4:9:11}$-3-oxo-12-acetoxy-20$\beta$-hydroxy-pregnadiene-18-acid.

The crude 18-hydroxy-compound used as starting material may be prepared as follows:

6 grams of lead tetraacetate are dried for 30 minutes at a water-jet vacuum and 30 minutes in a high vacuum. After the addition of 2 grams of calcium carbonate and 200 ml. of cyclohexane the whole is heated at the boil with stirring, 1.6 grams of iodine are added and the reaction mixture boiled under reflux for another hour. 1 gram of $\Delta^{5:9:11}$-3-ethylenedioxy-20$\beta$-hydroxy-pregnadiene is added to the boiling solution, the mixture is washed with 12 ml. of cyclohexane and then boiled for 4 hours with stirring. It is then cooled, filtered and washed with absolute ether. The filtrate is washed with an ice-cold solution of 5 grams of sodium thiosulphate in 20 ml. of water and three times with water; the aqueous solutions are then extracted twice more with ether. The combined organic solutions are evaporated in a flask containing 3 grams of sodium acetate and 3 grams of glacial acetic acid at a water-jet vacuum and at a bath temperature of 50° C. 30 ml. of acetic acid of 80% strength are then added and the reaction mixture is heated for 2 hours on a boiling water bath, cooled and evaporated almost to dryness at a water-jet vacuum. After the addition of ether, the reaction mixture is washed with water, 2 N-sodium carbonate solution and water, dried and evaporated again at a water-jet vacuum. The residue contains $\Delta^{4:9:11}$-3-oxo-18-hydroxy-18:20-oxido-pregnadiene.

*Example 9*

A mixture of 1 gram of chromium trioxide, 2 grams of silver chromate and 10 ml. of water is stirred for 3 hours at room temperature; 10 ml. of pyridine are then added with ice-cooling. After about 30 minutes the contents of the flask are viscous and pale orange. A solution of 1.0 gram of crude $\Delta^5$-3-ethylene-dioxy-11$\alpha$-acetoxy-18-iodo-18:20-oxido-pregnene in 10 ml. of pyridine is then added and the whole is stirred for 25 hours at room temperature and for 41 hours at 40° C. The reaction mixture is then treated with ether and dilute sodium chloride solution, filtered, washed with ether, and the organic phase washed three times with water. The aqueous solutions are extracted twice with ether, the organic solutions combined, dried and evaporated in a water-jet vacuum. To remove the pyridine the residue is dissolved in benzene, evaporated again at a water-jet vacuum, and this operation is repeated once. The residue is chromatographed on 40 grams of silica gel containing 15% of water. The crystalline fractions eluted with a mixture of benzene and ethyl acetate (19:1) are recrystallized from a mixture of methylene chloride and ether to yield 173 mg. of the 18:20-lactone of $\Delta^5$-3-ethylenedioxy - 11$\alpha$ - acetoxy - 20$\beta$ - hydroxy - pregnene-18-acid described in Example 7. In the mixed melting point test no depression of the melting point is observed and the infrared spectra are also identical.

In an analogous manner and starting from $\Delta^5$-3-ethylenedioxy - 20$\beta$ - hydroxy - pregnene the 20:18 - lactone of $\Delta^5$ - 3 - ethylenedioxy - 20$\beta$ - hydroxy - pregnene - 18-acid melting at 220–225° C. is obtained.

The crude 18-iodide used as starting material is obtained as follows:

6 grams of lead tetraacetate are dried for 30 minutes at a water-jet vacuum and for 30 minutes in a high vacuum. After the addition of 2 grams of calcium carbonate and 200 ml. of cyclohexane the reaction mixture is heated at the boil with stirring, treated with 1.6 grams of iodine and boiled under reflux for another hour. To the boiling solution there is then added 1 gram of $\Delta^5$ - 3 - ethylenedioxy - 11$\alpha$ - acetoxy - 20$\beta$ - hydroxy-pregnene, rinsed with 12 ml. of cyclohexane and then boiled for another 4 hours with stirring. The reaction mixture is cooled, filtered and washed with absolute ether. The filtrate is washed with an ice-cold solution of 5 grams of sodium thiosulphate in 20 ml. of water and three times with water, whereupon the aqueous solutions are extracted twice with ether. The combined organic solutions are evaporated at a bath temperature of 24° C. in a water-jet vacuum, a faintly yellow oil remaining behind which contains Δ$^5$-3-ethylenedioxy-11α-acetoxy-18-iodo-18:20-oxido-pregnene.

The oxidation of the crude Δ$^5$-3-ethylenedioxy-11α-acetoxy-18-iodo-18:20-oxido-pregnene may also be carried out as follows:

The crude product obtained from 20 grams of Δ$^5$-3-ethylenedioxy-11α-acetoxy-20β-hydroxy-pregnene by oxidation with lead tetraacetate and iodine as described above is dissolved in 400 ml. of absolute acetone. After the addition of 10 grams of silver chromate the mixture is first stirred for one hour at 50° C., then cooled to −10° C. and 23.6 ml. of a solution of 26.72 grams of chromium trioxide and 23 ml. of concentrated sulphuric acid made up to 100.0 cc. with water are added in the course of 10 minutes with stirring. Twenty minutes after addition is complete, the solution is diluted with a solution of 224 grams of crystalline sodium acetate in 400 ml. of water and with benzene, separated and the organic layer washed with semi-saturated sodium chloride solution. The aqueous layer is extracted once with benzene. From the residue of the organic solutions there are obtained by crystallization from ether 10.0 grams of the 18:20-lactone of Δ$^5$-3-ethylenedioxy-11α - acetoxy - 20β - hydroxy - pregnene - 18 - acid melting at 237–240° C.

*Example 10*

A solution of 1.1 grams of crude Δ$^5$-3-ethylenedioxy-9:11β;18:20β-bisoxido-18-iodo-pregnene in 10 ml. of pyridine is added to a mixture of 1.0 gram of chromium trioxide, 2.0 grams of silver chromate in 10 ml. of water with 10 ml. of pyridine which has been previously stirred for 1 hour and cooled to 0° C. The reaction mixture is then stirred for 48 hours at 40° C., cooled and treated with ether and dilute sodium chloride solution. The insoluble salts are separated off by filtration, the organic layer separated and extracted several times with ether. The extracts are washed with water, dried and evaporated in a water-jet vacuum. The residue (1.07 grams) is chromatographed on silica gel. With a mixture of benzene and ethyl acetate the pure 18:20-lactone of Δ$^5$ - 3 - ethylenedioxy - 9:11β - oxido - 20β-hydroxy-pregnene-18-acid can be eluted.

The crude iodine used as starting material may be prepared as follows:

6.0 grams of lead tetraacetate containing acetic acid are first dried at a water-jet vacuum, then under 0.1 mm. pressure of mercury and then added to a suspension of 2.0 grams of dry calcium carbonate in 200 ml. of cyclohexane. To the compound heated to the boil there are then added 1.6 grams of iodine and the whole is boiled under reflux for 1 hour. 1.0 gram of Δ$^5$-3-ethylenedioxy-9:11β-oxido-pregnene is then added and the solution boiled for another 3 hours while being irradiated with a 500-watt lamp. In the course of the reaction the solution becomes completely colorless. After cooling, the undissolved salts are filtered off and the residue washed thoroughly with ether. The filtrate is washed with sodium thiosulphate solution and water and evaporated at a water-jet vacuum at a bath temperature of 25–30° C. The residue contains Δ$^5$-3-ethylenedioxy-9:11β;18:20β-bis-oxido-18-iodo-pregnene.

*Example 11*

3.92 grams of crude Δ$^4$-3-oxo-11α-acetoxy-18-hydroxy-18:20β-oxido-pregnene are dissolved in 24 ml. of pyridine for the purpose of oxidation, and treated at 0° C. with a solution of a 6 grams of chromium trioxide in 12 ml. of water and 12 ml. of pyridine. After 18 hours at 20° C. about 100 grams of ice and 40 ml. of sodium bisulphite solution of 40% strength are added; the whole allowed to stand for 15 minutes, acidified with dilute hydrochloric acid, extracted with a mixture of ether and methylene chloride, washed with sodium bicarbonate and water until the washings are neutral, dried and evaporated. The resulting oil crystallizes on being sprinkled and yields 1.02 grams of crude 18:20-lactone of Δ$^4$ - 3 - oxo - 11α - acetoxy - 20β - hydroxy - pregnene-18-acid melting unsharply at 155–165° C.; its infrared spectrum is identical with that of the product described in Example 3. From the mother liquor further quantities of the same product are obtained.

The starting material used in this example is obtained as follows:

To a suspension, stirred and heated to 80° C., of 26 grams of dry lead tetraacetate and 8.8 grams of calcium carbonate in 1.2 liters of cyclohexane there are added 7.2 grams of iodine; the violet colored mixture is heated for 1 hour under reflux. After cooling to about 60° C., 3.80 grams of Δ$^4$-3-oxo-11α-acetoxy-20β-hydroxy-pregnene are added and the whole is boiled under reflux for 4 hours with stirring, using an electric burner. The cooled, colorless reaction mixture is filtered, washed with ether and the filtrate extracted once with a solution of 20 grams of sodium thiosulfate in 80 ml. of water and then three times with water. The undried solution is evaporated in vacuo in a flask containing 12 grams of sodium acetate and 12 ml. of glacial acetic acid, and the residue heated at 100° C. for 2 hours after the addition of 120 ml. of acetic acid of 80% strength. The reddish reaction mixture is treated with 20 ml. of water and evaporated in vacuo. The residue, taken up in ether and water, is washed with sodium bicarbonate solution and water until the washings are neutral, dried and evaporated. The residue contains Δ$^4$-oxo-11α-acetoxy-18-hydroxy-18:20-oxido-pregnene.

*Example 12*

455 mg. of crude Δ$^4$-3:11-dioxo-18-hydroxy-18:20β-oxido-pregnene are oxidized, as described in Example 11, with 750 mg. of chromium trioxide in 4.5 ml. of pyridine and 1.5 ml. of water. By working up in the usual manner there are obtained 365 mg. of a non-crystallizing oil. From the latter there are obtained by chromatography on neutral aluminum oxide 224 mg. of a product which crystallizes on being sprinkled. By recrystallization there are obtained 91 mg. of the 18:20-lactone of Δ$^4$-3:11-dioxo-20β-hydroxy-pregnene-18-acid melting at 228–234° C. The mother liquor contains approximately another 40 mg. of the same compound.

In an analogous manner there are obtained from 960 mg. of Δ$^5$-3-ethylenedioxy-11-oxo-20α-hydroxy-pregnene 395 mg. of the 18:20-lactone of Δ$^4$-3:11-dioxo-20α-hydroxy-pregnene-18-acid which melts at 257° C. after crystallization from a mixture of methylene chloride and ether; optical rotation $[\alpha]_D = +140°$ (in chloroform).

The 18-hydroxy-compound used as starting material in this example may be prepared as follows:

A suspension of 1 gram of calcium carbonate and 3 grams of lead tetraacetate (dried for half an hour in a water-jet vacuum and half an hour in a high vacuum) in 100 ml. of cyclohexane are boiled for a short time, and 0.800 gram of iodine is then added. After keeping the mixture for 1 hour at 80° C. 490 mg. of Δ$^5$-3-ethylenedioxy-11-oxo-20β-hydroxy-pregnene are added. The reaction mixture is heated at 80° C. for another 4 hours with stirring, then filtered, the residue washed with ether and the filtrate washed with a solution of 2.5 grams of sodium thiosulphate in 100 ml. of water and three times with water. The organic solution is evaporated in vacuo in a flask containing 1.5 grams of sodium acetate and 1.5 ml. of acetic acid, the residue heated for 2 hours at 100° C. after the addition of 15 ml. of acetic acid of 80% strength and, after evaporating the solvent in vacuo, worked up as described in Example 11. 455 mg. of a yellowish oil which contains Δ$^4$-3:11-dioxo-18-hydroxy-18:20β-oxido-pregnene are obtained.

Example 13

1.4 grams of crude $\Delta^5$-3-ethylenedioxy-11α:18-dihydroxy-18:20-oxido-19-nor-pregnene are dissolved in 7 ml. of pyridine and the solution is added to a mixture of 1.8 grams of chromium trioxide in 3.6 ml. of water and 3.6 ml. of pyridine. The reaction mixture is stirred for 20 hours at 30° C. 50 ml. of water are then added and the reaction mass extracted several times with ethyl acetate. The extracts are washed thoroughly with water, dried and evaporated. The residue is dissolved in benzene and filtered through a column containing 30 grams of silica gel. With a mixture of benzene and ethyl acetate 512 mg. of the pure 18:20-lactone of $\Delta^5$-3-ethylenedioxy-11-oxo-20-hydroxy-19-nor-pregnene-18-acid are isolated.

The 18-hydroxy-compounds used as starting material may be prepared as follows:

9.0 grams of lead tetraacetate are heated at the boil with 3.0 grams of calcium carbonate in 270 ml. of cyclohexane with stirring and exclusion of water and, after adding 2.4 grams of iodine boiled under reflux for one hour. 1.5 grams of $\Delta^5$-3-ethylenedioxy-11α-acetoxy-20β-hydroxy-19-nor-pregnene are added and boiling is continued with continuous stirring and irradiation with a 250-watt lamp until the color of the iodine has completely disappeared. The reaction mixture is cooled to 20° C., filtered and the filter residue washed with ether. The filtrate is washed with cold sodium thiosulphate solution and with water, the organic solution dried and 4.5 grams of anhydrous sodium acetate and 15 ml. of dimethylformamide are added and the readily volatile solvent distilled off in a water-jet vacuum. The remaining dimethylformamide solution is heated for 2 hours at 100° C., after the addition of another 15 ml. of dimethylformamide. The reastion mixture is evaporated in a water-jet vacuum, cooled, diluted with water and the precipitate formed taken up in ether. The ether extract is washed with water and filtered through a column of 15 grams of aluminum oxide. The column is rinsed thoroughly with ether and the filtrate evaporated to dryness. There are obtained 1.6 grams of crude $\Delta^5$-3-ethylenedioxy-11α:18-diacetoxy-18:20-oxido-19-nor-pregnene. The crude product is dissolved in 60 ml. of methanol, a solution of 3.0 grams of potassium carbonate in 20 ml. of water is added and the whole boiled for 3 hours under reflux in a nitrogen atmosphere. After the addition of another 20 ml. of water, the methanol is evaporated in a water-jet vacuum and extracted several times with methylene chloride. From the dried extracts there are obtained after evaporation 1.4 grams of a pale yellow residue which contains as main product $\Delta^5$-3-ethylenedioxy-11α:18-dihydroxy-18:20-oxido-19-nor-pregnene.

Example 14

12.0 grams of an oily crude product which contains 3β:11α-diacetoxy-18-iodo-18:20-oxido-5α-pregnane are dissolved in 200 ml. of acetone. The solution is then treated with 5.0 grams of silver chromate, stirred for 30 minutes at room temperature and, after cooling to 0–5° C., treated in the course of 5 minutes with 11.8 ml. of a solution of 13.26 grams of chromium trioxide and 11.5 ml. of concentrated sulphuric acid diluted with water to make up 50.0 cc. After stirring for 60 minutes at 0–5° C., a solution of 112 grams of crystalline sodium acetate in 200 ml. of water is added, the mixture diluted with benzene, the undissolved salts filtered off and the aqueous layer separated. The latter is extracted once more with benzene and the organic solutions washed with semi-saturated sodium chloride solution. From the dried organic solution there are obtained 11.14 grams of a crystalline crude product from which there may be isolated by crystallization from ether 7.15 grams of the pure 18:20-lactone of 3β:11α-diacetoxy-20β-hydroxy-5α-pregnane-18-acid melting at 216–218° C. Optical rotation $$[\alpha]_D = -24°$$

(in chloroform); infrared bands inter alia at 5.69μ (γ-lactone), 5.77μ (acetates), 7.26μ, 7.32μ, 8.12μ, 8.78μ, 9.75μ, and 10.44μ.

The crude 18-iodide used as starting material may be prepared as follows:

30 grams of lead tetraacetate dried in a water-jet vacuum are boiled in 1000 ml. of cyclohexane with 10 grams of dry calcium carbonate for 1 hour with stirring. 8.0 grams of iodine and 10.0 grams of 3β:11α-diacetoxy-20-hydroxy-5α-pregnane melting at 165–166° C. are added and the whole is boiled for 100 minutes with stirring and irradiation with a 500-watt lamp. After cooling, the undissolved salts are filtered off, the residue washed with cyclohexane, the filtrate extracted with sodium thiosulphate solution and with water and, after adding 2.5 ml. of pyridine, evaporated to dryness in a water-jet vacuum. The residue contains crude 3β:11α-diacetoxy-18-iodo-18:20-oxido-5α-pregnane.

Example 15

10.7 grams of crude 3α:11α-diacetoxy-18-iodo-18:20-oxido-5β-pregnane are oxidized with silver chromate and chromic acid-sulphuric acid in acetone as described in Example 14. After crystallization from ether 7.42 grams of the pure 18:20-lactone of 3α:11α-diactoxy-20β-hydroxy-5β-pregnane-18-acid melting at 226–229° C. are obtained; optical rotation $[\alpha]_D = 0°$ (in c hloroform); infrared bands inter alia at 5.71 (γ-lactone), 5.79μ (acetates), 7.29μ, 7.36μ, 8.14μ, 8.79μ, 9.78μ and 10.35μ.

The crude 18-iodo- compound used as starting material may be prepared as follows:

30 grams of lead tetraacetate, 10 grams of calcium carbonate and 8.0 grams of iodine in 1000 ml. of cyclohexane are reacted with 10.0 grams of 3α:11α-diacetoxy-20β-hydroxy-5β-pregnane melting at 155–156° C. (optical rotation $[\alpha]_D = -5°$ (in chloroform) prepared by catalytic hydrogenation of the corresponding 20-ketone with platinum in glacial acetic acid. After working up in the manner described in Example 14, crude 3α:11α-diacetoxy-18-iodo-18:20-oxido-5β-pregnane is obtained.

Example 16

11 grams of crude $\Delta^5$-3-ethylenedioxy-11α-acetoxy-18-iodo-18:20β-oxido-pregnene dissolved in 100 ml. of pyridine are added to an oxidation mixture prepared from 20 grams of silver chromate, 10 grams of chromium trioxide with 100 ml. of water and 100 ml. of pyridine. After being stirred for 16 hours at an internal temperature of 60° C., the mixture is cooled, rinsed in a separating funnel with 500 ml. of water, 10 ml. of saturated sodium chloride solution and 800 ml. of ethyl acetate, thoroughly shaken, filtered and washed twice with 600 ml. of ethyl acetate each time. The organic solutions are washed three times with 300 ml. of water each time, dried with sodium sulphate and evaporated in vacuo. The resulting brown colored oil is dissolved in 50 ml. of a mixture of benzene and ethyl acetate (9:1) and filtered through 40 grams of silica gel containing 15% of water, rinsing being performed with 950 ml. of a mixture of benzene and ethyl acetate (9:1). The eluate is evaporated in a water-jet vacuum and from the residue which is recrystallized from a mixture of methylene chloride and ether there are obtained 4.5 grams of the 18:20 lactone of $\Delta^5$-3-ethylenedioxy - 11α - acetoxy - 20α - hydroxy - pregnene - 18 - acid melting at 250–256° C.

The crude iodide used as starting material is prepared as follows:

A suspension of 60 grams of dried lead tetraacetate and 20 grams of dry calcium carbonate are heated to the boil with stirring. After 1 hour the mixture is treated with 16 grams of iodine and 10 grams of $\Delta^5$-3-ethylenedioxy-11α-acetoxy-20α-hydroxy-pregnene and rinsed with 70 ml. of cyclohexane. The reaction mixture is stirred for 2 hours under reflux while being irradiated with a 500-watt lamp. After cooling, the undissolved salts are suctioned off, the residue washed with 750 ml. of cyclohexane and the filtrate extracted with an ice-cold solution of 50 grams of sodium thiosulphate in 200 ml. of water. The reaction solution is washed twice with 200 ml. of water, treated with 5 ml. of pyridine, dried with sodium sulphate and evaporated in a water-jet vacuum at a bath temperature of 35° C. Crude $\Delta^5$-3-ethylenedioxy-11α-acetoxy-18-iodo-18:20β-oxido-pregnene is obtained.

*Example 17*

16.1 grams of crude $\Delta^5$-3β-acetoxy-18-iodo-18:20-oxido-pregnene dissolved in 150 ml. of pyridine are oxidized for 16 hours at 60° C. with 30 grams of silver chromate and 15 grams of chromium trioxide in 150 ml. of water and 150 ml. of pyridine. The reaction mixture is worked up as described in Example 14. By crystallizing the crude product from a mixture of methylene chloride and ether there are obtained 7.5 grams of the 18:20-lactone of $\Delta^5$-3β-acetoxy-20β-hydroxy-pregnene-18-acid melting at 204–206° C.

The crude 18-iodo-compound used as starting material is prepared as follows:

15 grams of $\Delta^5$-3β-acetoxy-20β-hydroxy-pregnene melting at 164–166° C. are treated as described in Example 14 in 3 liters of cyclohexane with 90 grams of lead tetraacetate and 24 grams of iodine and 30 grams of calcium carbonate with irradiation. The resulting crude product contains $\Delta^5$-3β-acetoxy-18-iodo-18:20-oxido-pregnene.

What is claimed is:

1. Process for the manufacture of 18:20-lactones of 20-hydroxy-pregnane-18-acids and their derivatives unsaturated in the nucleus, wherein a compound selected from the group consisting of an 18-iodo-18:20-oxido pregnane and its derivatives unsaturated in the nucleus is oxidized with a hexavalent chromium compound.

2. Process as claimed in claim 1, wherein oxidation is carried out with chromium trioxide.

3. Process as claimed in claim 1, wherein oxidation is carried out with chromium trioxide in the presence of a heavy metal chromate.

4. Process as claimed in claim 1, wherein oxidation is carried out with chromium trioxide in the presence of silver chromate.

References Cited in the file of this patent

Simpson et al.: Experentia 10, 132–133 (1954).

Shoppee: Chemistry of the Steroids, Butterworths Scientific Publications, London (1958), page 178.